Feb. 18, 1941.  W. B. FAGEOL  2,232,105
VEHICLE DRIVING CONSTRUCTION AND ARRANGEMENT
Filed June 4, 1936   3 Sheets-Sheet 1

Inventor
William B. Fageol

By Strauch & Hoffman
Attorneys

Feb. 18, 1941.  W. B. FAGEOL  2,232,105
VEHICLE DRIVING CONSTRUCTION AND ARRANGEMENT
Filed June 4, 1936  3 Sheets-Sheet 2

Inventor
William B. Fageol

Strauch & Hoffman
Attorneys

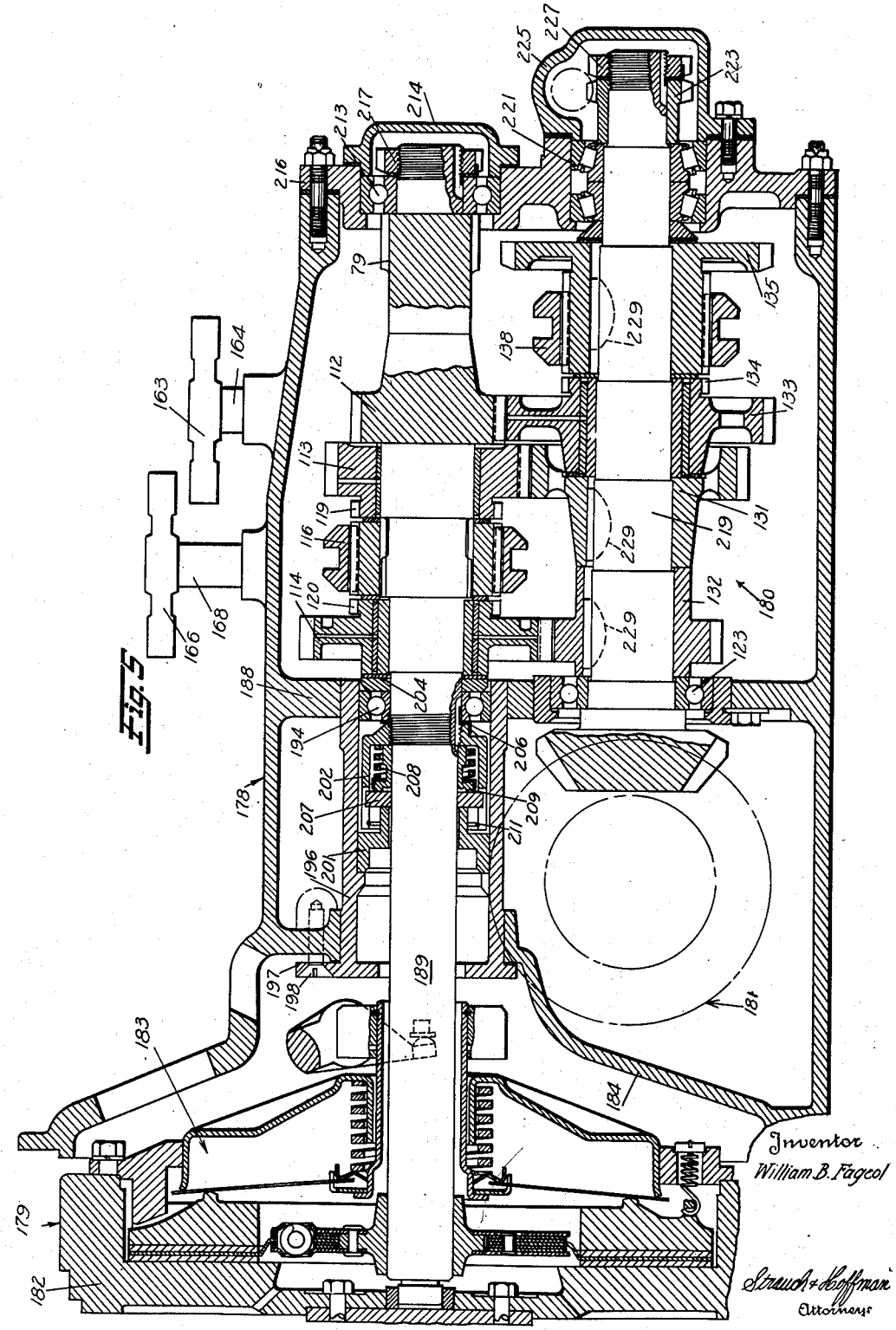

Patented Feb. 18, 1941

2,232,105

UNITED STATES PATENT OFFICE 2,232,105

VEHICLE DRIVING CONSTRUCTION AND ARRANGEMENT

William B. Fageol, Kent, Ohio, assignor to Twin Coach Company, Kent, Ohio, a corporation of Delaware Application June 4, 1936, Serial No. 83,548

13 Claims. (Cl. 180—54)

The present invention relates to power plant and transmission mechanisms for motor vehicles, and more particularly concerns vehicle power and drive mechanisms including a change speed transmission positioned transversely of the vehicle behind the drive axle thereof.

This application constitutes a continuation in part of my co-pending application, Serial Number 729,115, filed June 5, 1934, now Patent No. 2,083,059 in which application I have shown the power plant and transmission mechanism of the present invention in combination with a passenger carrying vehicle of novel construction. Although the present invention is especially adapted for application to motor vehicles of the passenger carrying type, it is to be understood that its use is not limited to such vehicles, and therefore in the present application disclosure will not be made of all the features and details of the vehicle construction of my co-pending application.

A primary object of the present invention is to provide a novel vehicle power delivery and drive mechanism in which the vehicle power plant is located adjacent and to the rear of the vehicle drive axle.

Another object of the present invention is to provide a novel power and drive mechanism for a vehicle, embodying a change speed transmission positioned transversely of the vehicle, and a longitudinal drive shaft extending from the transmission to the vehicle drive axle.

A still further object of the present invention is to provide a novel vehicle drive incorporating a change speed transmission having a power take-off shaft at right angles to the shaft of the transmission which is adapted to be driven by the vehicle drive motor.

It is another major object of this invention to provide a rear drive comprising a motor and a transmission aligned and disposed transversely of the vehicle in proximity to and parallelism with the vehicle drive axle, with a propeller shaft extending between the axle and that end of the transmission which is adjacent the motor.

Still another object of the present invention is to provide a novel vehicle drive incorporating a change speed transmission having a main shaft driven from the vehicle drive motor through a clutch, and a countershaft driven from the main shaft through gears comprising a change speed and reverse mechanism, the latter shaft driving a power take-off shaft for the vehicle wheels through bevel gears.

Still another object of the present invention is to provide a novel form of drive for a fan and other accessories to the vehicle power plant by means of a vehicle motor driven shaft extending beyond the enclosing casing for the change speed transmission mechanism.

A still further object of the present invention is to provide a novel power plant and drive mechanism for a vehicle wherein an auxiliary flywheel for the power plant encloses a friction clutch and is located at the end of the transmission remote from the motor.

The foregoing objects will be clarified, and further objects will appear from a study of the following description and the appended claims when taken in conjunction with the accompanying drawings, in which:

Figure 5 is a view similar to Figure 3 of a slightly modified form of clutch and transmission mechanism.

Figure 1:
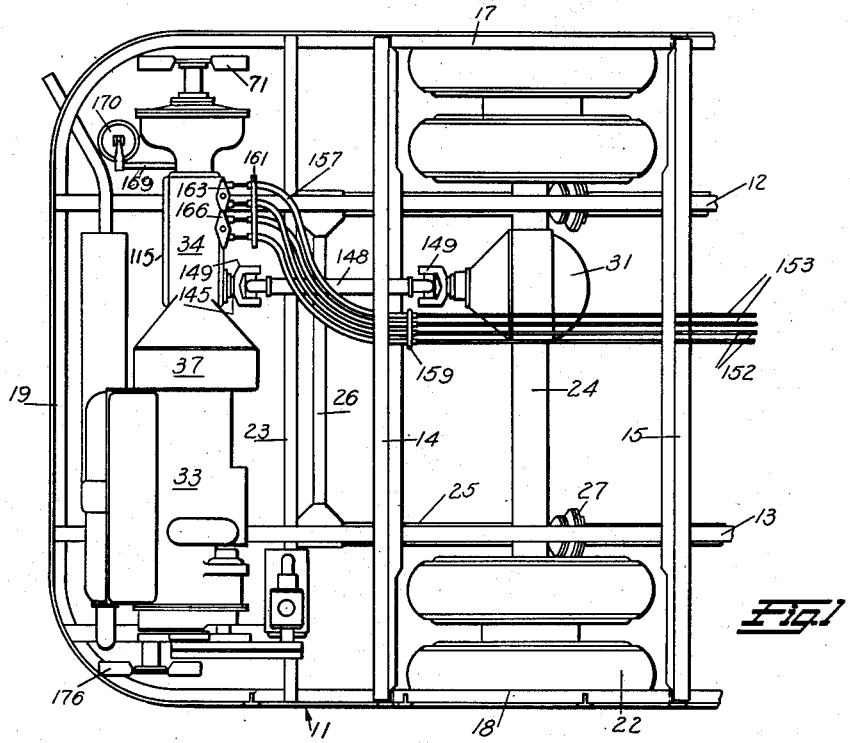
Figure 1 is a fragmental plan view of the rear end of a vehicle showing how the power drive and transmission mechanisms of the present invention are mounted transversely to the rear of the drive axle and connected thereto.
Figure 2:
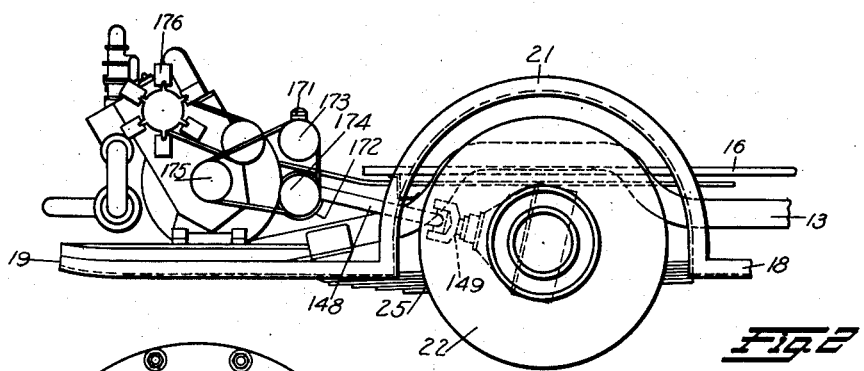
Figure 2 is a side elevational view of the construction illustrated in Figure 1.
Figure 4:
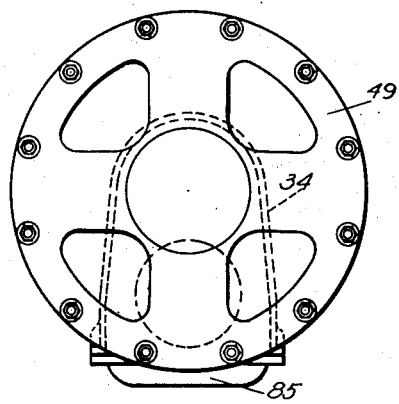
Figure 4 is an end elevational view of the transmission and clutch housing as seen when viewed from the right of Figure 3, parts of the mechanism being removed for clarity of illustration.

With reference particularly to Figures 1 and 2 of the drawings, the base frame 11 of the vehicle includes a pair of spaced longitudinal members 12 and 13 extending from end to end of the frame and secured in spaced parallel relation by a series of transverse members extending the full width of the vehicle, as illustrated by members 14 and 15 disposed adjacent the rear wheels. A floor section 16 is adapted to be supported on the transverse members 14 and 15.

Further longitudinal members 17 and 18 form side frame members and are preferably joined by an integral rear end member 19. The longitudinal members 17 and 18 are suspended in planes beneath the transverse members 14 and 15 and are thereto secured in any suitable manner. The frame members 17 and 18 are bent upwardly at 21 to clear the rear road wheels 22, and the transverse frame members 14 and 15 are secured to the upwardly curved portions 21 in any suitable manner. An auxiliary transverse frame member 23 lies beneath members 16 and 17 and interconnects the latter to the rear of curved portions 21.

Base frame 11 is resiliently supported upon the vehicle axles, the rear axle being shown at 24, by means of springs 25. The spring supporting structure may be of any form conventional in the art. An auxiliary transverse frame member 26 is provided for interconnecting the longitudinal frame members 12 and 13 adjacent the points of connection to springs 25. The vehicle road wheels are equipped with brakes of conventional form that are actuated by a mechanism including fluid cylinders 27 under control of the vehicle operator in any well known manner.

The rear axle 24 is supported by the drive wheels 22 which are preferably attached to live axle sections disposed within the axle housing and operatively connected to a differential of conventional form mounted within a differential housing 31. The dual drive wheels 22 are driven from the vehicle power plant through the novel drive arrangement forming the major feature of the present invention. The arrangement of the power plant and the details of the novel drive mechanism will now be described.

Figure 3:
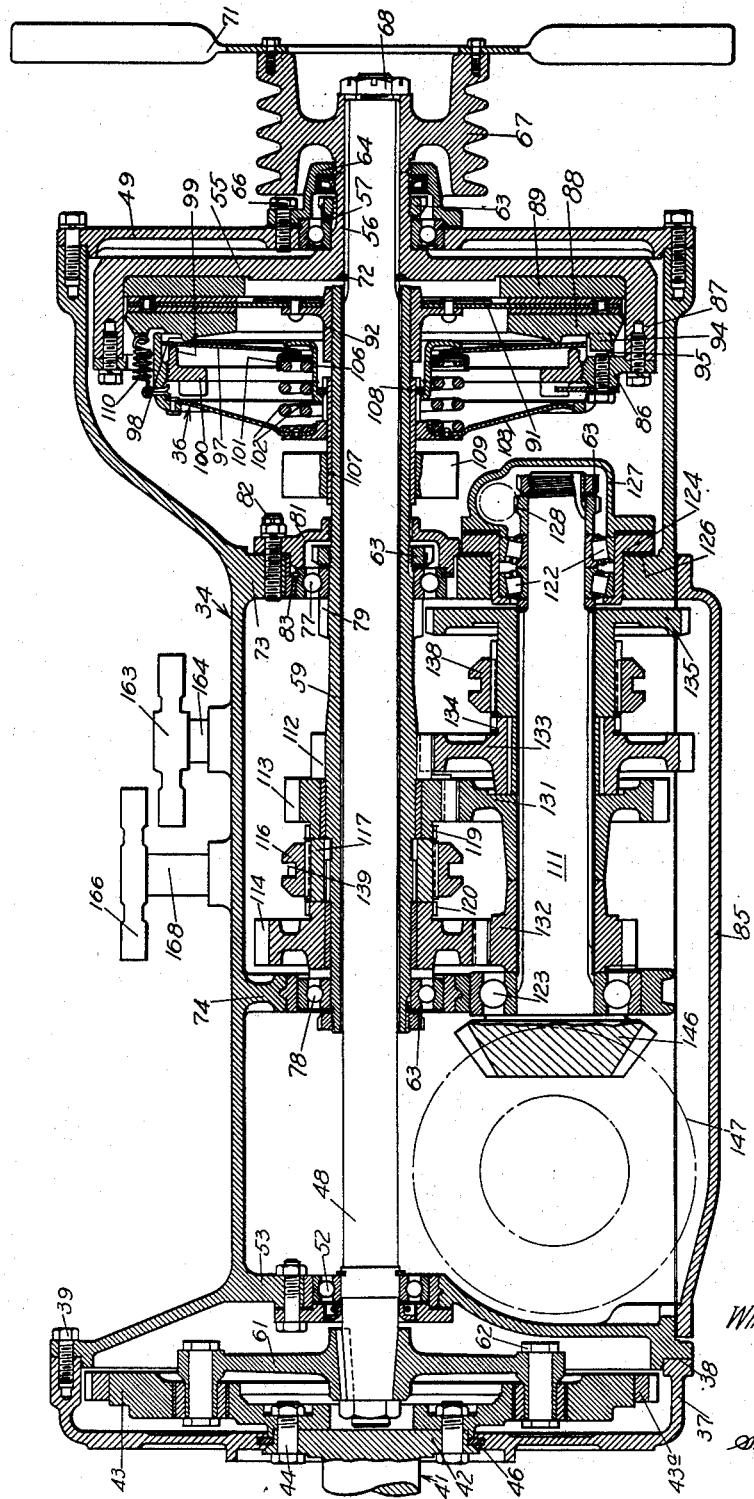
Figure 3 is a vertical sectional view taken substantially axially of the clutch and change speed transmission mechanism shown in Figure 1, transversely of the vehicle frame.

The power plant and transmission mechanism, mounted transversely on the base frame 11 of the body to the rear of the differential drive axle 22 is preferably of unitary construction and comprises an internal combustion engine 33 and a change speed transmission mechanism of novel form housed in a casing 34. A friction clutch, indicated generally by reference character 36 (Fig. 3), is also housed within the casing 34 and is associated in a novel manner with the transmission mechanism and serves to disconnect the engine 33 from the transmission when desired. Referring in detail to Figure 3 of the drawings, the housing 34 at the end adjacent the engine 33 is provided with a bell-shaped cover plate 37 adapted to be secured in any suitable manner to an end of the engine housing. A shouldered recess 38 at the end of the housing 34 snugly receives the outside rim of the bell-shaped flywheel housing 37, and bolts 39 or other suitable fastening devices are used for securing the housing 34 to the flywheel housing 37.

The engine crank shaft or an extension 41 thereof is provided at its end with a disk-like member 42 to which a flywheel 43 is secured by cap screws 44. A packing ring 46 cooperates with a beveled oil slinger at the end of the crankshaft 41 and seals the flywheel compartment in the cover plate 37 from the engine crankcase. The flywheel 43 is provided with an external ring gear 43a adapted to be engaged by the pinion of an electric or any other suitable starting motor (not shown).

A shaft 48 extends through the housing 34 and one end of this shaft projects beyond the end cover plate 49 of the housing for a purpose to be described. The shaft 48 is rotatably supported adjacent one end by a bearing 52, preferably of the antifriction type suitably carried in an aperture in the partition wall 53. The other end of the shaft 48, which projects through the cover plate 49, is splined for a portion of its length and receives a second or auxiliary flywheel 55 having an axially extending internally splined hub 56. A bearing 57 positioned within an aperture in the cover plate 49 rotatably supports the flywheel hub 56 and shaft 48 nested therein.

A hollow gear cluster shaft 59 surrounds the shaft 48 and is driven from the said shaft through the clutch 36 which is housed in the flywheel 55 in a manner to be described.

The shaft 48 is driven from the crank shaft 41 by a coupling member 61 which is keyed or otherwise suitably secured to the end of shaft 48. A nut on the threaded end of the shaft secures the latter to the coupling member 61. The spider arms of the coupling member are connected by bolts 62 to the flat radial portion of the flywheel 43. The portions of the flywheel at the points of connection of the arms of the spider 61 are preferably provided with suitably mounted inserts so that the driving connections between the crank shaft 41 and the drive shaft 48 will be flexible in character.

The inner race of the bearing 57 is maintained in position on the hub 56 of flywheel 55 by means of a fitting 63, which is screwed over a threaded section of the hub. The outer race of the bearing 57 is held in position in the cover plate 49 by means of a cap 64 which is secured to the cover plate by screws 66 or other suitable fastening means. The packing member seated within the recess at the end of the cap 64 remote from the cover plate 49 bears against the hub 56 and effectively seals the joints between the relatively movable parts against escape of lubricant.

The projecting end of the shaft 48 is provided with an internally splined pulley 67 which abuts the hub 56 of the flywheel and is retained in position by the nut 68 on the reduced threaded end of the shaft 48. The pulley 67 is grooved so that it may be used to drive accessories such as a generator or compressor or other auxiliary apparatus. A fan 71 is provided on the end of the pulley and may be used to draw or force a current of air through a cooling radiator for the internal combustion engine in the well known manner. The nut 68 also serves to maintain the flywheel in position longitudinally of the shaft 48 by holding it against the stop or split ring 72.

The flywheel 55 forms a part of the friction clutch assembly 36 and is accommodated in a chamber formed at the end of the casing 34 at one side of the partition wall 73. A second partition wall 74 divides the casing longitudinally and the hollow gear cluster shaft 59 is carried by bearings 77 and 78 supported in the walls 73 and 74 respectively. The inner race of the bearing 77 is retained in position against the end of a pinion 79, formed on the shaft 59 by means of a clamping device 63 in the manner described in connection with the inner race of bearing 57. The outer race of the bearing 77 is retained in position in the wall 73 by means of a cap 81 secured in position by bolts 82 or other suitable securing means. A ring 83, engaged in a groove in the bearing race is seated against a shoulder formed in the bearing recess. The inner race of the bearing 78 is positioned against the gear assembly, to be later described in connection with the description of the change speed mechanism, by means of a clamping member 63 threaded on the end of the shaft 59. A removable cover 115 gives ready access to the space within the housing 34 between the partition walls 53 and 73 and, like the covers 37 and 49, is held in place by suitable bolts 39.

The clutch 36, which provides a driving connection between the shaft 48 and the hollow gear cluster shaft 59 may be of usual construction, but modified in certain respects in view of the novel arrangement of shafts 48 and 59. It is located in "outboard" fashion for convenience of control, but may obviously be located conventionally as in copending applications, Serial Number 15,085 now Patent No. 2,118,810 and Serial No. 15,488 now Patent No. 2,118,811. The flywheel 55 is chambered for reception of the operative parts of the clutch 36 and the open end of the chamber is closed by a cover plate 86 bolted to the axially extending flange 87 which encloses the chambered interior of the flywheel.

An axially adjustable friction clutch member 88 co-acts with a friction member 89 on the flywheel to clamp between them a friction disk 91 through which the shaft 59 is rotated. This disk is riveted or otherwise secured to a splined collar 92 which is received upon the splined end of the shaft 59 to permit it to have a slight axial movement relative thereto. The disk 91 is faced on each surface with suitable friction material for cooperation with the friction members 88 and 89. The friction clutch member 88 is caused to revolve with the flywheel by lugs 94 formed at suitable intervals on said clutch member, and these lugs extend between inwardly projecting lugs 95 on the cover plate 86. The clutch member 88 is normally forced into contact with the friction disk 91 by means of a plurality of levers 97 which are fulcrumed on projections 98 and 99 formed upon member 88 and an adjustable portion 100 of cover plate 86. Pressure is applied to the inner ends of the levers by an axially movable collar 101 and springs 102, the latter being interposed between a member 103 which is secured to the cover plate, and the collar 101. A radially flanged sleeve 106 is secured to an axially reciprocable collar 107 journalled over the shaft 59 and levers 97 are pressed against the radial flange of the sleeve 106 by the springs 102.

The sleeve 106 is restrained against axial movement to the right on collar 107 by a ring 108. Axial movement of the collar 107 to the left carries the flanged sleeve 106 with it and releases the pressure of the levers against the clutch member 88. A suitable release collar 109 is revolvably supported at the end of the collar 107 for connection to a lever or other suitable clutch operating means. In order that the clutch member 88 may separate from the friction disk 91 when the pressure on the levers is released, a series of springs 110 is provided, which springs are secured to the cover plate 86 and the clutch member 88 and these springs exert tension on the clutch member to withdraw it when the pressure on the levers 97 is released.

The operation of the friction clutch just described is believed to be obvious and no further description thereof seems necessary. It will be noted, however, that the clutch disk 91 and the release mechanism and its associated parts are carried upon the hollow gear cluster shaft 59, and that the latter and the shaft 48 are concentric and extend from the clutch 36 toward the engine and transmission mechanism.

The countershaft 111 of the transmission mechanism is driven from the hollow shaft 59 through a series of gears and clutching devices. Previously mentioned pinion 79, and a pinion 112, are formed on or secured to the shaft 59. Gears 113 and 114 are journalled for rotation upon the shaft 59 and are adapted to be clutched to the shaft by an internally splined dog clutch member 116 which is slidable on the splined sleeve 117, the latter being keyed on or otherwise secured for rotation with the shaft 59. The previously mentioned bearing adjustment member 63 serves to axially position the gears 113 and 114 and the sleeve 117 on the shaft 59. The hub of each gear 113 and 114 is provided with clutch teeth 119 and 120, whereby either of these gears may be secured to the shaft 59 by moving the dog clutch member 116 axially on the sleeve 117.

The shaft 111 is journalled in partition walls 73 and 74 by bearings 122 and 123. The bearing 122 is a combined radial and thrust bearing carried in a cage or housing 124. This housing is adjustable axially of the aperture in the partition wall 73 by removing or replacing shims 126. A cap member 127 covers the bearing cage or housing 124 and carrines a speedometer drive pinion which is meshed with a speedometer drive gear 128. A threaded member 63 retains the gear 128 in position.

Gears 131 and 132 are splined or otherwise keyed to the shaft 111 and are constantly in mesh with the gears 113 and 114 on the shaft 59. A third gear 133 is rotatably journalled on the shaft 111 and is provided with clutch teeth 134 on an axial extension of its hub. A fourth gear 135 is keyed or otherwise secured for rotation with the shaft 111 and is provided with an axially extending splined hub upon which the internally splined dog clutch member 138 is slidably mounted. It will be noted that the teeth of pinion 79 and gear 135 are chamfered so that a slidable idler pinion (not shown) may be engaged with the gear and pinion when it is desired to reverse the direction of rotation of shaft 111.

High speed drive of the shaft 111 is obtained by moving the dog clutch member 116 to the left by means of a suitable shifter fork engaged in the groove 139 so that the clutch teeth 120 are engaged by the internal splines of the dog clutch member. The sleeve 117 and the gear 114 rotate together driving the gear 132 which is secured to shaft 111. It will be understood that when the dog clutch member 116 is moved to the left, the dog clutch member 138 is in the position shown and the gears 79 and 135 are not interconnected by the shiftable idler pinion.

The shaft 111 is selectively driven at a lower speed by sliding the dog clutch member 116 to the right so that the gear 113 is clutched for rotation with the sleeve 117. Gear 113 drives shaft 111 through its meshing engagement with the gear 131.

A still lower relative speed of rotation of the shaft 111 is secured by moving the dog clutch member 138 to the left into engagement with the teeth 134 formed on the hub of gear 133. The shaft 111 rotates with the gear 135 which is clutched to gear 133, this latter gear being driven by the pinion 112, with which it is constantly in mesh.

When the shiftable idler gear is meshed with pinion 79 and gear 135 for reversing the direction of rotation of shaft 111 it will be understood that dog clutch member 116 is in the position illustrated on the drawings. The dog clutch member 138 which is preferably interconnected with the shifter mechanism for the shiftable idler pinion will assume a position to the right of that shown in the drawings. By interconnecting the shifting mechanism for the dog clutch member 138 and the shiftable idler pinion possible damage to the transmission is prevented which would result if the idler pinion and the clutch member 138 were independently movable.

A power take-off shaft 145 (Figure 1), rotatably mounted on the casing 34 in suitable bearings, extends from the side of the casing and is driven from the shaft 111 by a bevel pinion 146 and the bevel gear 147. A propeller shaft 148 extends forwardly from the power take-off shaft 145 to the drive axle 24 and is provided with universal joints 149 of any approved design and the necessary slip joints permitting extension of the drive shaft as the axle 24 follows irregularities in the roadway. The relatively small drive wheels 22, previously described, make possible the use of a relatively light drive axle 24 for transmitting the power of the engine to the drive wheels 22. The preferred location of power take-off shaft has been described, but where it is desirable or where the vehicle on which the transmission of the present invention is installed requires alteration of the location of the take-off shaft 145, the countershaft 111 may be positioned above shaft 48. This alternative location of shaft 111 will raise the shaft 145 and allow the shaft 148 to be inclined. This arrangement of the parts is suggested by Figure 1 of the drawings.

The change speed transmission mechanism is under control of the vehicle operator through two pairs of cables 152 and 153 which extend longitudinally and rearwardly to the transmission casing 34. These cables are disposed beneath the floor 16 of the vehicle and preferably pass through the vertical webs of the transverse frame members of the base frame 11. Cable sheaths 157 are provided for the rear ends of the cables 152 and 153 and are secured adjacent one end thereof to the floor 16 by a cleat 159, and by a similar cleat 161 to the vehicle body frame. Each cable of the pair 153 is connected to an end of a lever 163 which is secured to an upright shaft 164 (Figure 3) connected to the shifter mechanism for one of the sliding clutch members 116 or 138. Each cable of the pair 152 is likewise connected to an end of a lever 166. The lever 166 is secured on a shaft 168 connected to the shifting mechanism for the sliding idler gear and the clutch member 138. By this arrangement a pull on one of the cables of a pair will oscillate the associated lever from one extreme position in its range of movement to the other extreme position. The lever is returned by a pull on the other cable of the pair to any desired intermediate position or to its extreme position in the other direction. The shafts 164 and 168 are thus positively turned in the desired direction to effect movements of the shiftable elements of the transmission mechanism. The remote control for the change speed transmission mechanism so provided is positive in operation and precludes the possibility of partial movement of change speed elements of the transmission.

An operating shaft 169 (Fig. 1) for the clutch device is actuated by a fluid cylinder 170, the admission of fluid to this cylinder being under control of the operator by a suitable valve.

The engine is inclined from the vertical, as shown by Figure 2, to reduce its overall height, but is otherwise of substantially conventional design except for a slight modification in the crank case thereof to furnish suitable points of connection to the vehicle frame.

The engine accessory units are compactly arranged, as seen in Figure 2, to conserve the space thereby occupied. These accessories include a fluid compressor 171 for supplying fluid to the vehicle braking system and other fluid operated appliances, and a generator 172 for charging the vehicle storage battery (not shown). The compressor and generator are mounted on a support extending from the side of the engine 33, and are provided with drive pulleys 173 and 174 respectively, which are driven by a belt from a pulley 175 on the engine crank shaft 41. If desired, a fan 176 of conventional form may be provided on engine 33 in addition to fan 71 for assistance in providing a draft across the engine.

Figure 5 illustrates a slightly modified form of transmission and drive mechanism which is similar to the transmission and drive construction shown in my Patent No. 2,118,811. In this form of the invention the vehicle clutch is located conventionally between the engine and the combined transmission and power take-off unit in contrast to the form of the invention illustrated in Figure 3 wherein an outboard clutch is located unconventionally at the end of the transmission mechanism remote from the vehicle engine.

Indicated generally at 178 is a housing assembly for enclosing a clutch unit 179, a transmission mechanism 180, and a power take-off 181. Clutch unit 179 comprises a flywheel 182 and a clutch proper indicated generally at 183, nested within the flywheel. The concentrated mass of the flywheel 182 is approximately equal to the sum of the individual masses of the flywheel 43 and the auxiliary flywheel 55 of Figure 3.

Figure 5 differs primarily from Figure 3 by omission of sleeve 59 surrounding the main transmission shaft, and by mounting of the transmission gearing directly on the main shaft. A pair of partition walls 184 and 188 serve to divide housing 178 into a plurality of separate compartments and further serve to support a cylindrical member 196 having a flange 197 secured to partition wall 184 by means of bolts 198. A bearing 194 mounted within sleeve 196 is designed to rotatably support main transmission shaft 189. Also mounted within sleeve 196 is a sealing gland 201 designed to cooperate with an annular member 202 threaded on shaft 189 in abutment with bearing 194 which in turn abuts a stop ring 204. Member 202 is secured in proper adjustment on shaft 189 by means of a lock washer 206 having tongues designed to engage matched slots in the washer and shaft. A pair of packing members 207 and 209 are urged into contact with sealing gland 201 by means of a compression spring 208.

The end of housing 178 remote from clutch 179 is closed by an end plate 216 within which is mounted a bearing 213 for supporting the end of shaft 189. A locknut assembly 217 is provided on the end of shaft 189 for retaining the bearing in position, and a cap plate 214 is provided for enclosing the bearing and locknut assembly.

A countershaft 219, corresponding to countershaft 111 in Figure 3, is supported at its forward end in partition wall 188 and at its rear end is supported in a bearing assembly 221 mounted in end plate 216. Upon the extreme rear end of the countershaft is mounted a speedometer drive assembly 223 enclosed within a cap plate 225. A locknut 227 retains the bearing and speedometer drive in position.

The change speed gears and sliding clutches mounted on main shaft 189 and countershaft 219 are counterparts of the change speed gearing disclosed in Figure 3, and operation of the gearing takes place in the manner described in detail in connection with Figure 3. In view of the similarity of disclosure in Figures 3 and 5 relative to the change speed gearing, identical reference characters have been applied to corresponding elements. It will be noted, however, that the main shaft gears of Figure 5 are mounted directly on the main shaft 189, whereas in Figure 3 the corresponding gears are mounted on sleeve 59 which surrounds the main shaft. Furthermore, the countershaft gears of Figure 5 are secured to the countershaft by means of keys 229 in place of the splines disclosed in Figure 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a motor vehicle having a frame work, a power plant transversely mounted at one end of the framework and comprising an engine and an elongated housing including two gear compartments aligned with the engine, and a third compartment adjacent its outer end, a change speed mechanism comprising gearing in the middle compartment, and a pair of parallel shafts, one of said shafts being engine driven and passing into said third compartment, the other of said shafts comprising a countershaft associated with said gearing and extending at one end into the other of said gear compartments, a driving gear on said extending end, a set of drive wheels disposed relatively close to the power plant with their axes in parallelism therewith, a differential unit for driving said wheels, a propeller shaft assembly connected between said differential unit and said countershaft, said assembly projecting into said last named gear compartment and including a gear in mesh with said driving gear of the countershaft, and a clutch driven by said engine driven shaft and located in said third compartment, said clutch being connected to said change speed gearing by a sleeve surrounding said engine driven shaft.

2. In a change speed transmission mechanism, an engine driven shaft, a hollow shaft surrounding said engine driven shaft, clutching means between said engine driven shaft and said hollow shaft, a countershaft, variable speed drive means for driving said countershaft from said hollow shaft, a vehicle drive shaft at right angles to said countershaft and means operatively connecting said countershaft to said vehicle drive shaft.

3. In a vehicle drive mechanism, a drive axle; a power plant assembly comprising a prime mover and a unitary casing attached to said prime mover; said assembly being arranged parallel to and disposed relatively close to said axle; a clutch driven by said prime mover and located in the portion of said casing remote from said prime mover; a shaft driven by said prime mover through said clutch and extending from said clutch to a point between said clutch and said prime mover and adjacent to said prime mover; a countershaft in said casing; change speed gearing interposed between said countershaft and said driven shaft; and a propeller shaft connecting said axle and said countershaft.

4. In a vehicle drive mechanism, a rear axle assembly including a differential; a power plant assembly comprising an engine, a variable speed transmission and a clutch arranged in end to end spaced relation; the longitudinal axis of said assembly being parallel to and relatively close to said axle assembly; a power delivery shaft operatively connecting said engine and said clutch; a shaft interconnecting said clutch and transmission extending towards said engine parallel to said power delivery shaft; a propeller shaft; and means operatively connecting said propeller shaft with said transmission at a point between said engine and said clutch and adjacent to said engine, said propeller shaft being arranged to transmit power to said differential.

5. In a vehicle drive mechanism, an engine having a power delivery shaft; a casing secured to said engine and having an enlarged outer end; a clutch housed by said casing in said enlarged outer end and spaced from said engine; a shaft connected to said power delivery shaft and to said clutch and having an end extending beyond, and journalled in said enlarged outer end of said casing; power transmitting means on said extended end; a second shaft connected to said clutch and extending therefrom towards said engine; and power delivery means on said last named shaft, including change speed gearing in said casing between said clutch and said engine, for delivering power to a final drive propeller shaft.

6. In a vehicle drive mechanism, an engine having a power delivery shaft extending from one end; a housing secured to said end of said engine and having an end wall remote from said engine; a first shaft journalled at one end in said end wall and coupling means connecting the other end of said shaft to said power delivery shaft; a clutch carried by said first shaft within said housing and adjacent to said housing end wall; a second shaft surrounding said first shaft and operatively associated with said clutch at one end; the other end of said second shaft extending from said clutch towards said engine; a third shaft journalled in said housing adjacent to said engine with its axis at an angle to said aforementioned shafts; and variable speed transmission means to transmit power from said second shaft to said third shaft.

7. In a vehicle drive, the combination set forth in claim 6, wherein said coupling means is resilient.

8. In a vehicle drive mechanism, a rear axle having a differential; a power plant and transmission assembly, comprising a prime mover, a transmission and a clutch arranged in end to end relation in the order set forth, positioned with its longitudinal axis parallel to and disposed relatively close to said rear axle, a power take-off shaft associated with said transmission and extending from said power plant assembly to said differential with its axis intersecting said assembly between said transmission and clutch and said prime mover and adjacent to said prime mover.

9. In a vehicle, a rear axle including a differential; a frame structure carried by said axle; a power plant assembly mounted on said frame structure with its longitudinal axis parallel to and disposed relatively close to said axle, said power plant assembly comprising an engine, a transmission and a clutch arranged in end to end relation in the order set forth; a casing carried by said engine and housing said transmission and said clutch; means for driving said clutch from said engine; means for driving said transmission from said clutch; a take-off shaft journalled in said casing adjacent to said engine and positioned between said clutch and transmission and said engine; and means to drive said take-off shaft from said transmission.

10. In a vehicle drive mechanism, a power transmission assembly comprising an engine having a power delivery shaft; an elongated housing secured to said engine and having an enlarged outer end; a shaft connected to said power delivery shaft and journalled in the enlarged end of said casing; a clutch carried by said first named shaft within said enlarged end of said casing; a second shaft drivingly associated with said clutch and extending back towards said engine; bearing means carried by said housing for journalling said second shaft, said second shaft being hollow and surrounding said first shaft; a power take-off shaft journalled in said casing adjacent to said engine with its axis at an angle to said casing and said aforementioned shafts; and means to transmit power from said second shaft to said power take-off shaft.

11. In a vehicle drive mechanism, the combination set forth in claim 10 wherein said means for transmitting power from said second shaft to said take-off shaft comprises a countershaft having a plurality of change speed gears thereon meshing with gears carried by said second named shaft.

12. In a motor vehicle having a framework; a power plant transversely mounted at one end of the framework and comprising an engine, an elongated housing secured to said engine and including two gear compartments and a third compartment, aligned with the engine in the order named; a change speed mechanism comprising gearing in the middle gear compartment; a pair of parallel shafts, one of said shafts being engine driven and passing through said middle gear compartment into said third compartment, the other of said shafts comprising a countershaft associated with said gearing in said middle compartment and extending at one end into the other of said gear compartments, a driving gear on said extending end adjacent to said engine; a set of driving wheels disposed relatively close to the power plant with their axes in parallelism therewith; a differential unit for driving said wheels; power transmitting means connecting said differential unit and said countershaft, said means projecting into said last named gear compartment and including a gear in mesh with said driving gear of the countershaft; and a clutch driven by said engine driven shaft and located in said third compartment, said clutch being connected to said change speed gearing by a hollow shaft surrounding said engine driven shaft.

13. In a vehicle drive mechanism; a power plant assembly comprising an engine having a power delivery shaft, an elongated housing secured to said engine in alignment therewith and having an enlarged outer end, wall members dividing said housing into three compartments, one adjacent to said outer end, one adjacent to said engine, and a third between said other two; a clutch housed by said housing in said first compartment adjacent to said enlarged end and spaced from said engine; a first shaft connected to said power delivery shaft and to said clutch and having an end journalled in said enlarged end of said housing; a second shaft connected to said clutch and extending therefrom towards said engine into said third compartment, said second shaft surrounding said first shaft and journalled in said housing; a third shaft journalled in said housing and located in said third compartment with one end extending into the compartment adjacent to said engine; a power take-off gear on said extended end of said third shaft for delivering power to a final drive; and change speed gearing in said third compartment for transmitting power from said second shaft to said third shaft.

WILLIAM B. FAGEOL.